United States Patent
Liu et al.

(10) Patent No.: US 8,274,869 B2
(45) Date of Patent: Sep. 25, 2012

(54) METHOD FOR DETECTING BLANK AREA OF POWER CALIBRATION AREA

(75) Inventors: Yao Wen Liu, Hsinchu (TW); Chung Yi Wang, Hsinchu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 117 days.

(21) Appl. No.: 12/474,824

(22) Filed: May 29, 2009

(65) Prior Publication Data

US 2010/0135131 A1 Jun. 3, 2010

(30) Foreign Application Priority Data

Nov. 28, 2008 (TW) ................................ 97146106 A

(51) Int. Cl.
*G11B 7/00* (2006.01)
(52) U.S. Cl. ..................................................... 369/47.53
(58) Field of Classification Search .................. None
See application file for complete search history.

(56) References Cited

U.S. PATENT DOCUMENTS

2007/0014217 A1* 1/2007 Cho et al. ..................... 369/47.5

* cited by examiner

*Primary Examiner* — Wayne Young
*Assistant Examiner* — Brian Butcher
(74) *Attorney, Agent, or Firm* — Muncy, Geissler, Olds & Lowe, PLLC

(57) ABSTRACT

The present invention relates to a method for detecting a blank area of a power calibration area. The method includes the steps of: selecting a recording test area in the power calibration area; writing the recording test area with multiple stages of normal power and detecting power; forming multiple normal blocks and detecting blocks, wherein each of the detecting blocks includes one unit of unrecorded block and one unit of recorded block; and reading information from the unrecorded blocks of the detecting blocks and thus determining whether the unrecorded blocks of the detecting blocks are blank or not. Once all the unrecorded blocks of the detecting blocks are determined to be blank, it represents that the selected recording test area is totally blank.

17 Claims, 8 Drawing Sheets

METHOD FOR DETECTING BLANK AREA OF POWER CALIBRATION AREA

BACKGROUND OF THE INVENTION

This application claims priority of No. 097146106 filed in Taiwan R.O.C. on Nov. 28, 2008 under 35 USC 119, the entire content of which is hereby incorporated by reference.

1. Field of Invention

The present invention relates to the technology of optical storage media, and more particularly to a method for detecting a blank area of a power calibration area.

2. Related Art

In the present recording technology, an optimum power calibration (OPC) procedure is performed before recording in order to reduce the recording failure and increase the stability of the recorded data. Performing an optimum power control procedure can find a set of optimum laser powers suitable for the recording of this optical disc so that the jitter value or the decode error rate value of the radio frequency (RF) data recorded on the optical disc is better suppressed and the optimum write quality can be obtained.

However, the positions on the optical disc where the optimum power control procedure can be performed are specified in the specification of each optical disc, and not all the positions are suitable for the optimum power control procedure. The recordable optical disc, such as CD-R, DVD+R, DVD-R, or the like, only can be recorded once. If the optimum power control procedure is performed in the data area, then the formal data cannot be correctly recorded. The rewriteable optical disc, such as CD-RW, DVD+RW, DVD-RW, DVD RAM, or the like, can be recorded repeatedly. However, the recording time is significantly lengthened if the optimum power control procedure has to be performed in the data area in each recording procedure. Although the optical discs have various specifications, the specified area for the optimum power calibration procedure, which is referred to as a power calibration area (PCA), may be distributed in a lead-in area and a lead-out area (i.e., an innermost ring and an outermost ring of the optical disc).

The optimum power control procedure defined in the typical specification includes a β method mainly applied to the one-time programmable optical disc, and a γ method mainly applied to the rewriteable optical disc. The principles of the β and γ methods will be described in the following.

FIGS. 1A to 1C respectively show waveforms of three different radio frequency signals obtained after data is recorded with three different laser powers and then read back. As shown in FIGS. 1A to 1C, different powers of laser beams cause different depths of radio frequency signals, wherein the influence on the shorter radio frequency signal (e.g., 3T) is especially obvious. In the β method, different powers of laser beams are utilized to record the test data into the power calibration area, and then the optimum write power (Pwo) of the laser beam is searched according to the symmetry of the radio frequency signal. In the specification, the definition of $\beta=(A1+A2)/(A1-A2)$ is also simultaneously made. So, when the β value approximates to zero, the radio frequency signal becomes the most symmetrical. That is, the jitter value or the decode error rate value is the minimum. As shown in FIG. 1A, $|A1|<|A2|$ and $\beta<0$, which represent that the used laser power P is lower than the optimum write power Pwo. In FIG. 1B, $|A1|\approx|A2|$ and $\beta\approx0$, which represents that the used laser power P is substantially equal to the optimum write power Pwo. In FIG. 1C, $|A1|>|A2|$ and $\beta>0$, which represents that the used laser power P is higher than the optimum write power Pwo.

The γ method is similar to the β method in the write power, but the measurement and the calculation of the γ method are more complicated. FIGS. 2A and 2B are schematic illustrations showing the γ method used to define an optimum power. As shown in FIGS. 2A and 2B, M is firstly defined as the modulation amplitude according to the following equation:

$$M = I14/I14H \qquad \text{EQ1}$$

In addition, γ is defined as follows:

$$\gamma = \frac{dm}{dP_w} \times \frac{P_w}{m} \qquad \text{EQ 2}$$

Next, as shown in FIG. 2B, in which the relationship between γ and the write power is depicted, the optimum write power is determined according to the following equation:

$$P_{target} = PW \text{ (power at } \gamma_{target}).$$

$P_{WO} = \rho \times P_{target}$, wherein $P_{WO}$ is the optimum write power and ρ is the multiplication factor.

$P_{EO} = \epsilon \times P_{WO}$, wherein $P_{EO}$ is the optimum erase power, ε is a ratio of the erase power to the write power, and the values of $\gamma_{target}$, ρ and ε may be obtained by reading the absolute time in pre-groove (ATIP) in the lead-in area.

FIG. 3 is a schematic illustration showing a conventional optimum power calibration procedure. Referring to FIG. 3, the optimum power calibration procedure substantially includes the following steps.

In the first step, some parameters, such as $\beta_{target}$, $\gamma_{target}$, and the like are obtained from the ATIP in the lead-in area of the optical disc, and the range of the laser power for test recording is calculated.

In the second step, a random EFM (Eight to Fourteen Modulation) signal is generated, and the test recording is performed in the power calibration area (PCA) of the lead-in area with 15 stages of test recording power P01 to P15 shown in the drawing.

In the third step, the random EFM signal recorded in the power calibration area is read back, and the optimum write power $P_{WO}$ is calculated according to the β (one-time programmable optical disc) or γ (rewriteable optical disc) method. In FIG. 3, the β method will be described as an example.

In the fourth step, the procedure of the optimum power calibration procedure ends.

In the present CD recording technology, the multi-time recording has been used. Thus, when the disc still has the unrecorded blank area and the disc is not finalized, the recording still can be continued. Thus, the optimum power calibration procedure still has to be performed on the disc. When the second time of optimum power calibration procedure is performed, it is necessary to search a blank area again in the lead-in area or the lead-out area to serve as the new power calibration area, and the above-mentioned four steps are performed in this new power calibration area. However, two drawbacks tend to be encountered when the second time of optimum power calibration procedure is performed.

First, the servo state is poor in the previous optimum power calibration and optimum focus position calibration procedures, the applied power is too small or the focus position deviates from the optimum focus point. Thus, the generated radio frequency signal is poor, or the amplitude of the radio frequency signal is too small. So, when the blank area detection (blank detection) is being performed, the recorded area (the area after the optimum power calibration procedure is performed) tends to be misjudged as the blank area.

Second, because the performance or the designed parameters of the blank area detection circuit are poor, the recorded area (the area after the optimum power calibration procedure is performed) tends to be misjudged as the blank area.

According to the first and second drawbacks, it is obtained that if the recorded area is misjudged as the blank area, the recorded area will be repeatedly recorded when the optimum power calibration procedure and the optimum focus position calibration procedure are subsequently performed. Thus, the results obtained after the optimum power calibration procedure and the optimum focus position calibration procedure are performed deviate from the expected results, or the calibration procedure may fail to cause the poor recording power or the poor focus position used in recording the data area. Finally, the recorded quality is poor or the recorded data cannot be easily read back. Consequently, it is obtained that the correctness of the blank area detection closely relates to the optimum power calibration procedure and the optimum focus position calibration procedure, so the correct and stable blank area detection becomes relatively important.

SUMMARY OF THE INVENTION

It is therefore an objective of the present invention to provide a method for detecting a blank area in a power calibration area so that the stability of detecting the blank area can be effectively enhanced and the time for detecting the blank area can be shortened.

The present invention achieves the above-identified objective or other objectives by providing a method for detecting a blank area of a power calibration area. The method includes steps of: selecting a recording test area in the power calibration area of an optical disc; writing the recording test area and thus forming a plurality of normal blocks and a plurality of detecting blocks, wherein each of the detecting blocks comprises at least one unit of unrecorded block and at least one unit of recorded block; and determining whether the unrecorded blocks of the detecting blocks are blank. If the unrecorded blocks of the detecting blocks are not totally blank, the above-mentioned steps are repeated or an error recovery procedure is entered. If the unrecorded blocks of the detecting blocks are totally blank, the recording test area is determined to be blank.

The present invention additionally provides a method for detecting a blank area of a power calibration area. The method includes the steps of: selecting a recording test area in the power calibration area of an optical disc; applying a plurality of normal powers and a plurality of detecting powers to the recording test area and thus forming a plurality of normal blocks and a plurality of detecting blocks, wherein each of the detecting blocks comprises one unit of unrecorded block and one unit of recorded block, and the plurality of normal blocks is formed by applying the normal powers having the same recording power and by changing a focus position each time; and determining whether the unrecorded blocks of the detecting blocks are blank. If the unrecorded blocks of the detecting blocks are not totally blank, the above-mentioned steps are repeated or an error recovery procedure is entered. If the unrecorded blocks of the detecting blocks are totally blank, the selected recording test area is determined to be blank.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

A recording test area is firstly selected using a simple binary search, and then the method of the present invention is adopted to further identify that the searched area at this time is a totally blank area. If the searched area is not the totally blank area, the optical head is again moved to search another blank area, and the method of the present invention is again adopted to further identify whether the area is the totally blank area. If the searched area is identified as the totally blank area, the information is read from the recording test area to serve as a basis for an optimum power calibration procedure and an optimum focus position calibration procedure. Therefore, using the method of the present invention can precisely detect the blank area of the power calibration area to ensure that the optimum power calibration procedure or the optimum focus position calibration procedure is reliable. The spirit of the present invention will be described with reference to the following embodiments.

Figure 1A:
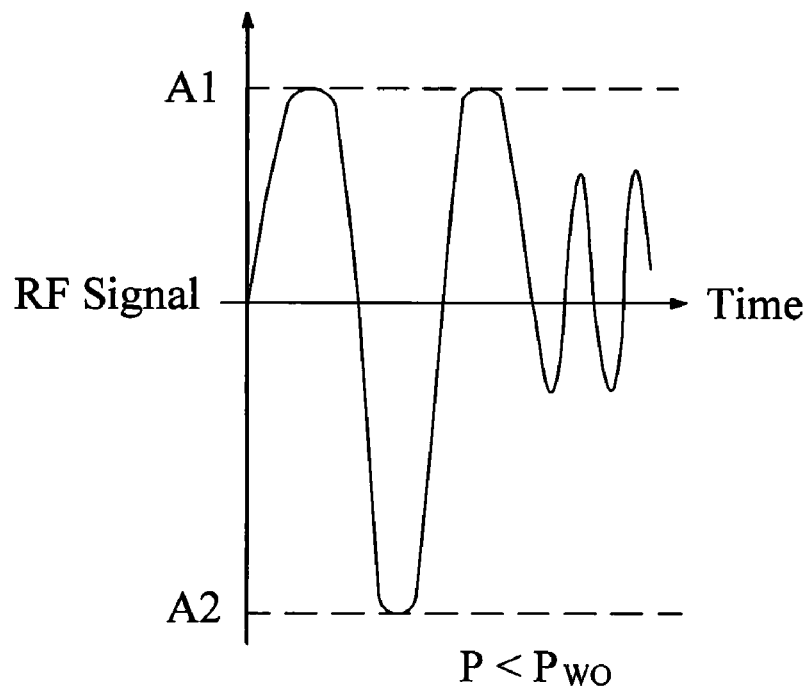
FIGS. 1A to 1C respectively show waveforms of three different radio frequency signals obtained after data is recorded with three different laser powers and then read back.
Figure 1B:
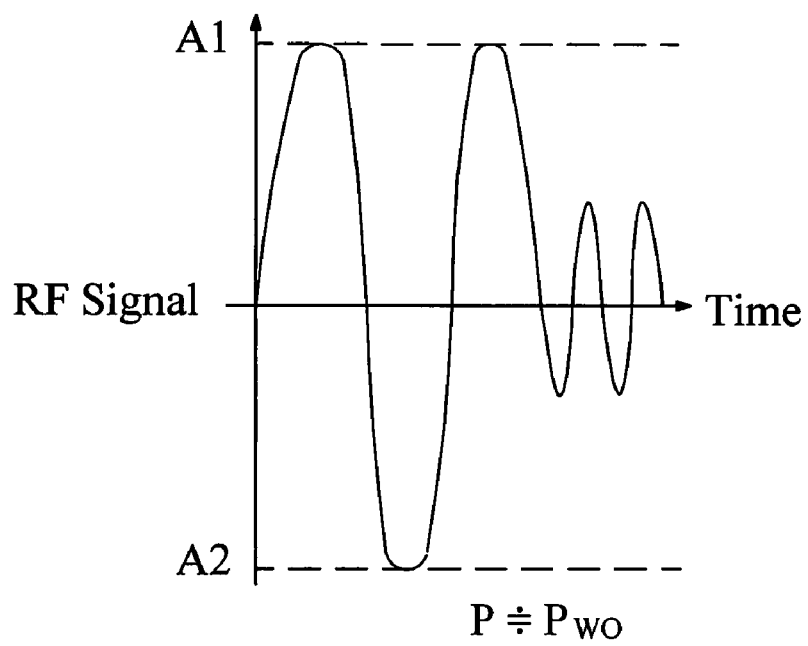
Figure 1C:
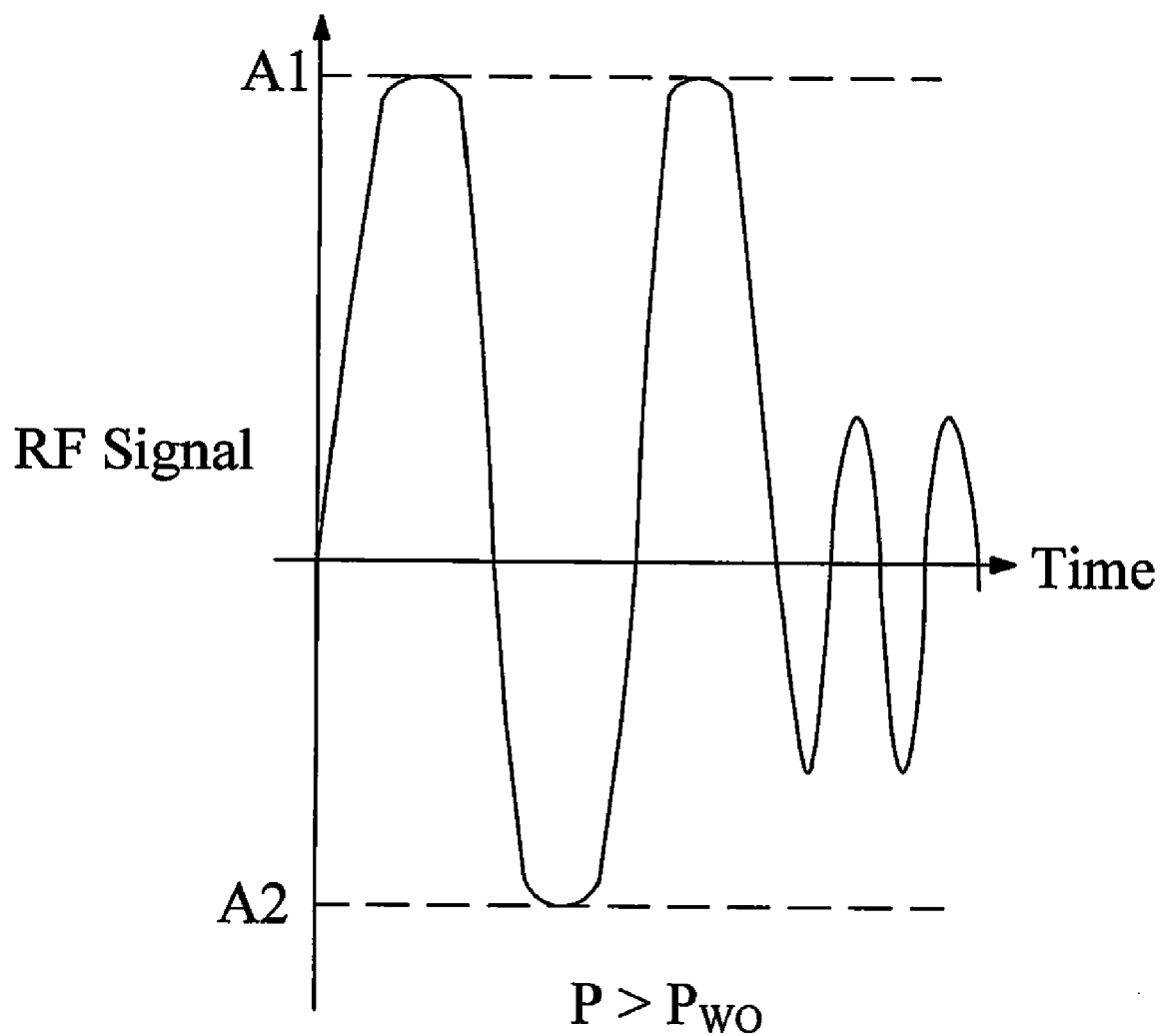
Figure 2A:
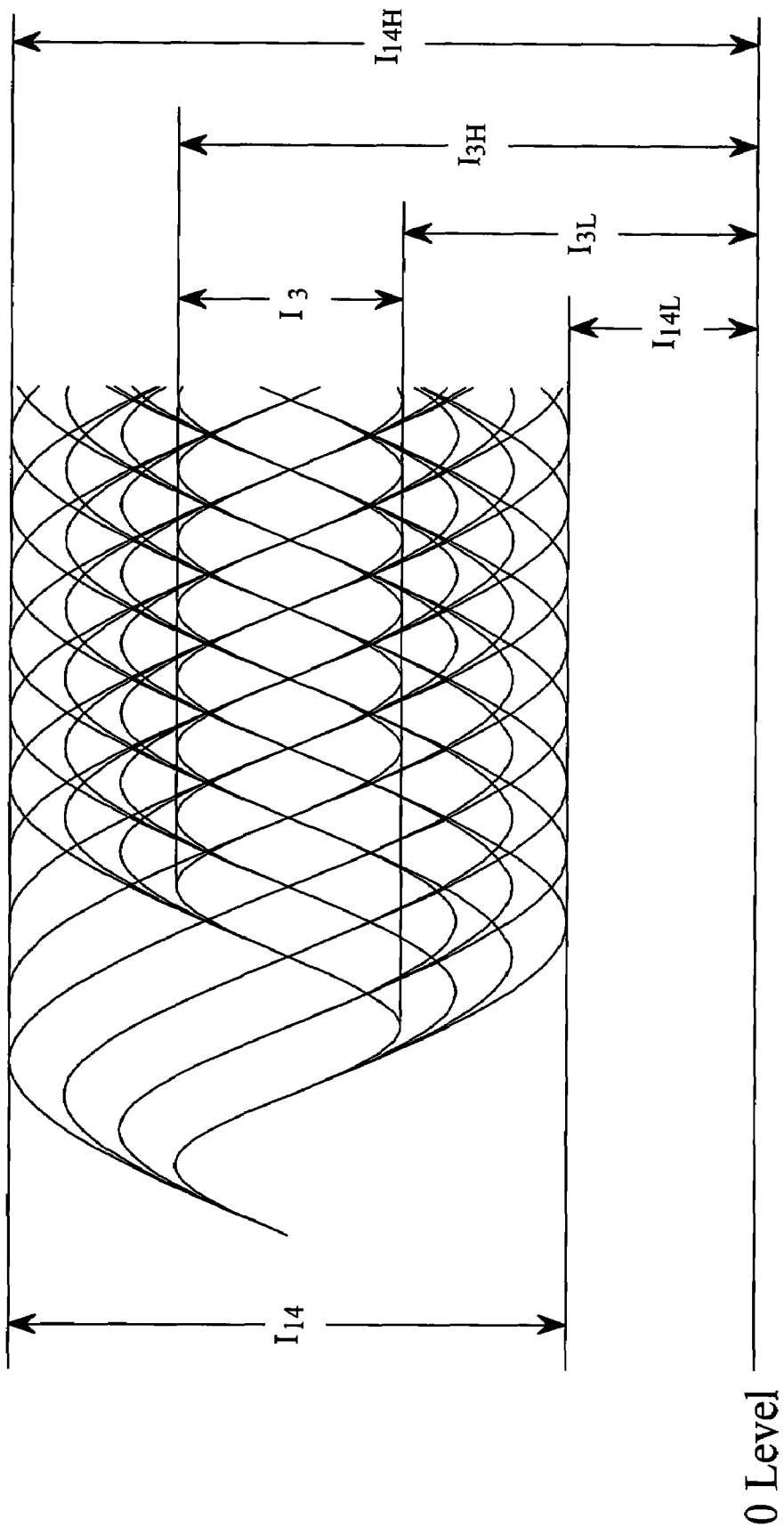
FIGS. 2A and 2B are schematic illustrations showing a $\gamma$ method used to define an optimum power.
Figure 2B:
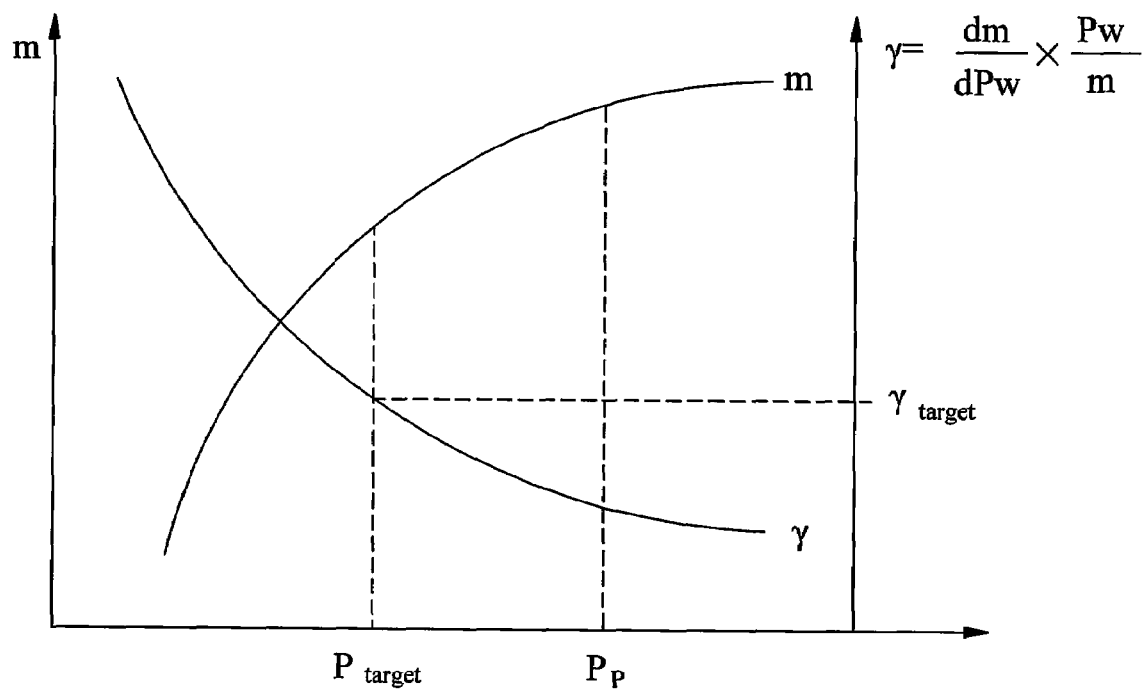
Figure 3:
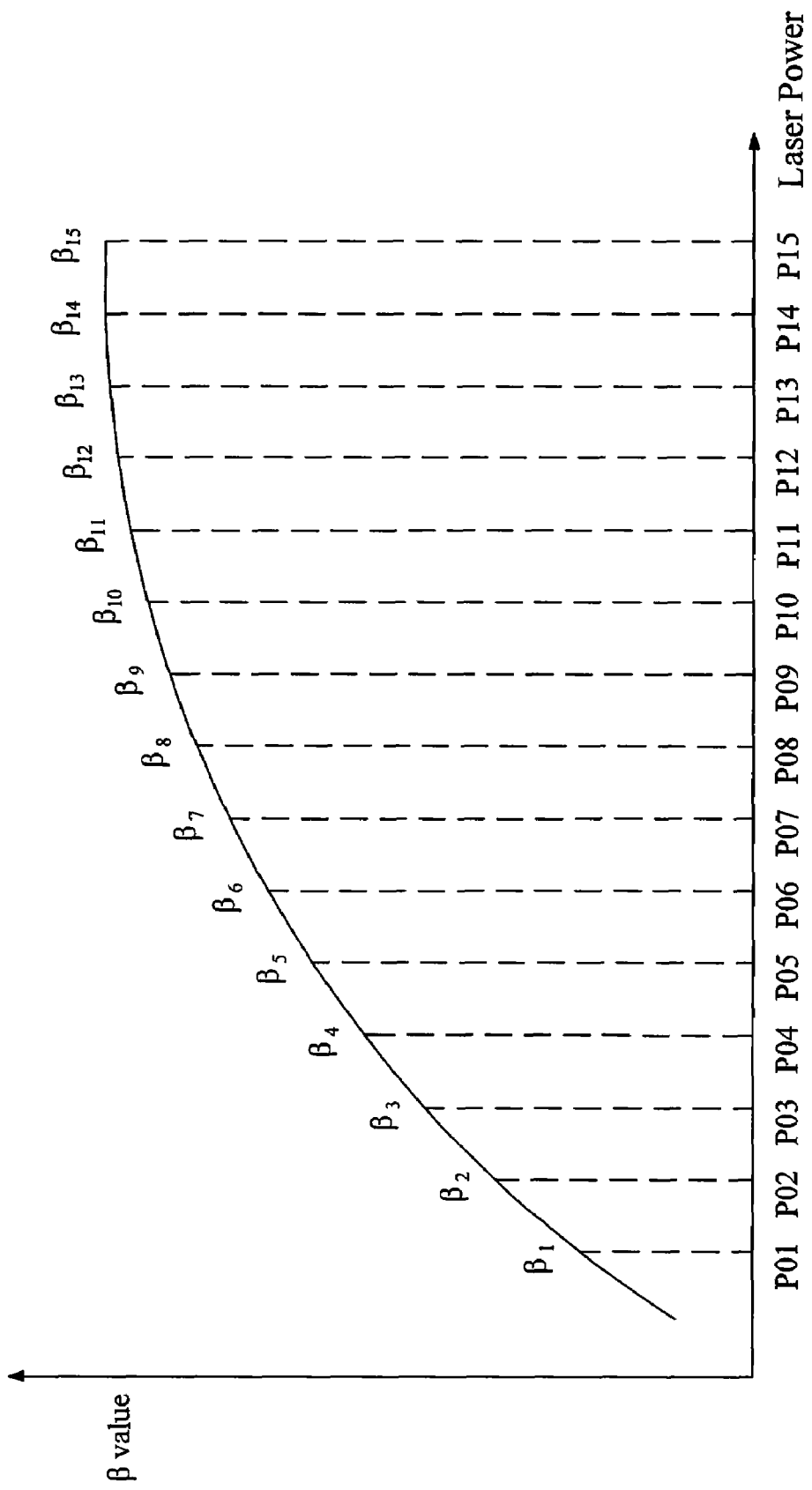
FIG. 3 is a schematic illustration showing a conventional optimum power calibration procedure.
Figure 4:
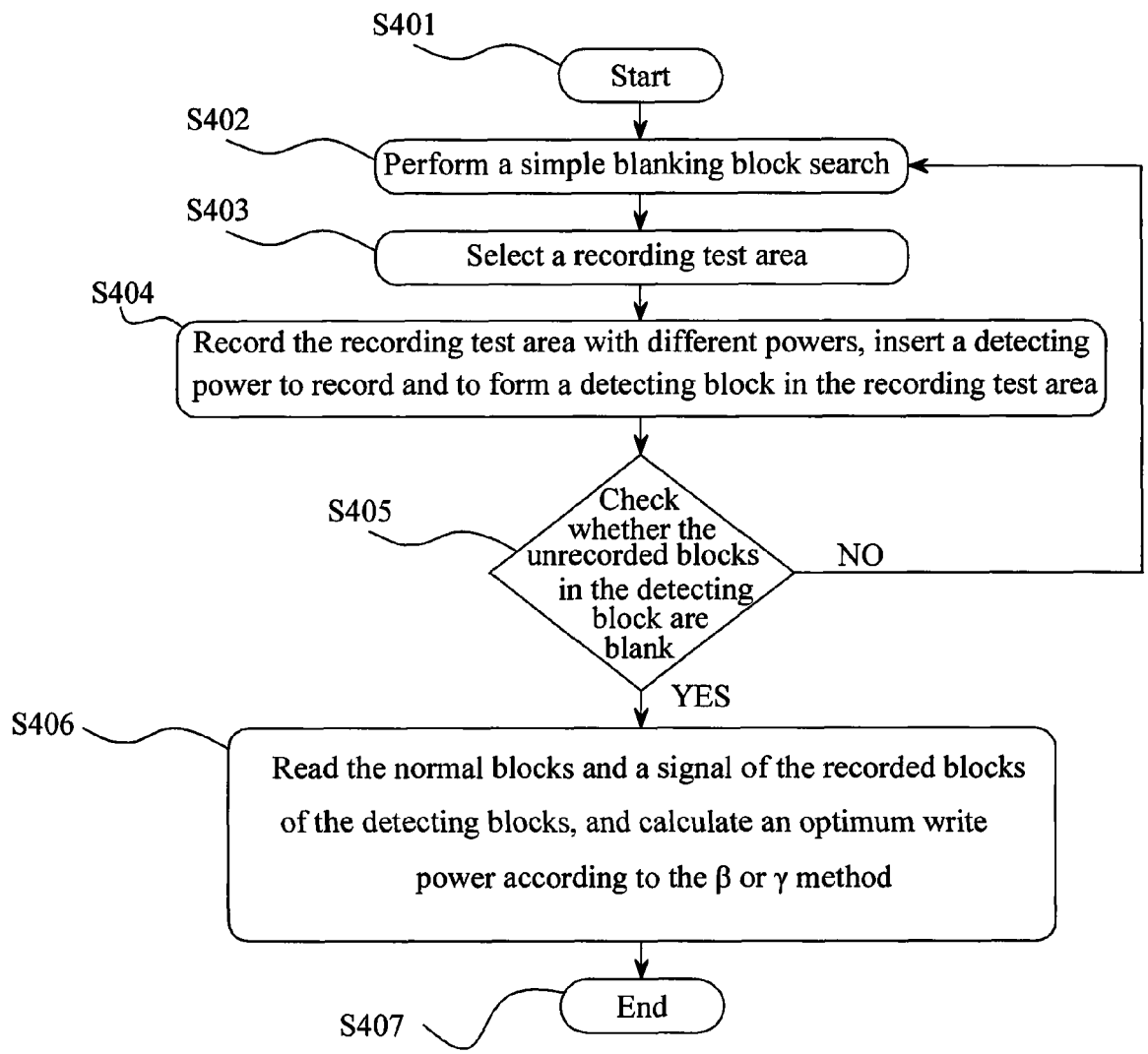
FIG. 4 is a flow chart showing an optimum power calibration method of an optical head according to an embodiment of the present invention.
Figure 5:
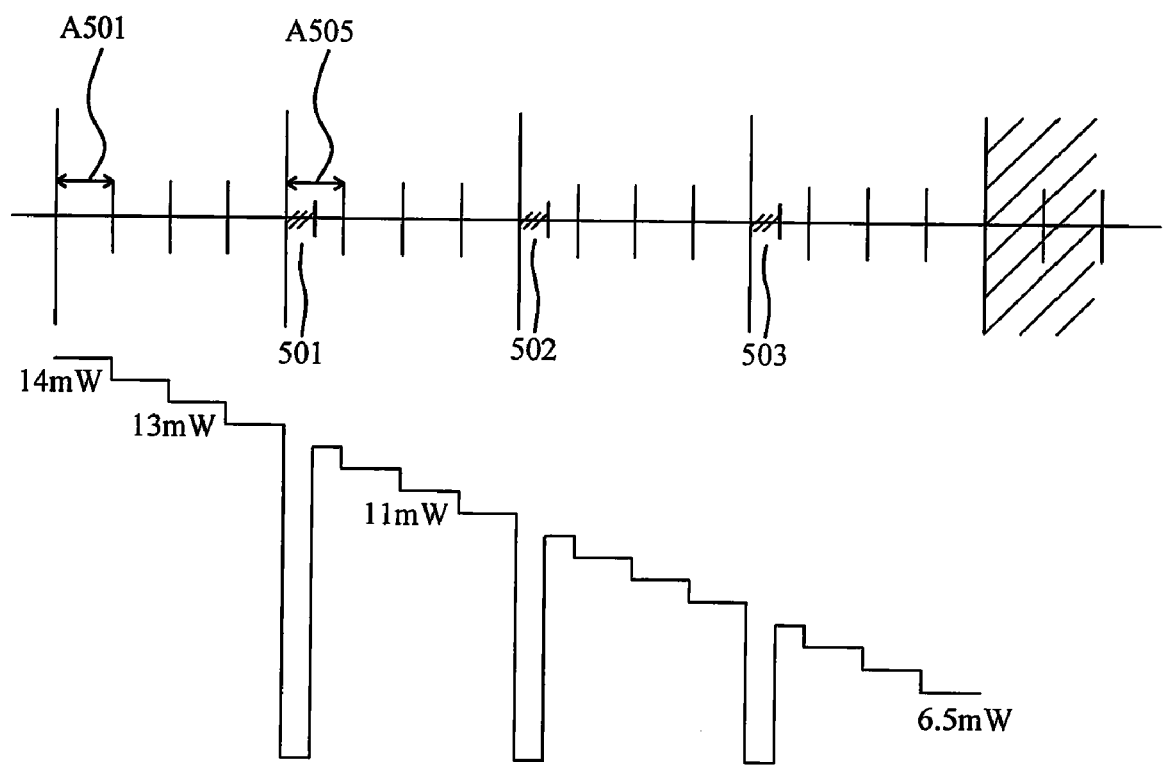
FIG. 5 is a schematic illustration showing the optimum power calibration method of the optical head according to the embodiment of the present invention.

FIG. 4 is a flow chart showing an embodiment of the present invention. FIG. 5 is a schematic illustration showing 15 stages of powers applied in the embodiment of the present invention. Referring to FIGS. 4 and 5, it is assumed that the optical disc has been recorded but not finalized before this method is described. This optical disc has the property that a certain area in the lead-in area or the lead-out area has been recorded with the optimum power calibration procedure. Thus, when the power calibration area needs to be used again, it is necessary to identify that the searched blank area is a totally blank area so as to ensure the precision of the subsequent optimum power calibration procedure or optimum focus position calibration procedure. The method for detecting the blank area of the present invention used in the optimum power calibration procedure of the optical head includes the following steps.

In step S401, the method starts.

In step S402, a simple blank block search is performed on the optical disc. Because the position of the optical disc, at which the optimum power calibration procedure may be performed, and the optimum focus position of the optical disc are located in the lead-in area or the lead-out area, the simple blank block search only has to be performed in the power calibration area.

In step S403, a recording test area is selected after the simple search.

In step S404, the recording test area is recorded with multiple stages of powers. As shown in the example of FIG. 5, in which the optimum power calibration procedure is performed, the 15 stages of powers composed of the normal powers and the detecting powers are applied to the recording test area and the normal blocks and the detecting blocks are correspondingly formed. In the embodiment according to the present invention, several detecting powers are inserted to record data during the recording procedure so that the detecting blocks 501, 502 and 503 are formed in the recording test area. In other words, if the recording test area selected in the step S403 is totally blank, these detecting blocks 501, 502 and 503 should also be blank.

In the preferred embodiment of the present invention, the step of forming the detecting blocks includes the following sub-step (a), (b) or (c).

In the sub-step (a), each of the stages of detecting powers is set to be composed of one unit of reading power and one unit of recording power. When the power is applied to the recording test area, the detecting block is correspondingly formed.

In the sub-step (b), each of the stages of detecting powers may be composed of one unit of recording power, and another unit power is set to be insufficient to form a pit or a mark by reducing an output power of each of analog channels when a total output power is applied to the recording test area so that the detecting block is correspondingly formed.

In the sub-step (c), when one of the units of the detecting powers is applied, a focus position or an optical head tilt is deviated such that a pit or a mark cannot be sufficiently formed on the optical disc. When another one of the units of the detecting powers is applied, the focus position and the optical head tilt are kept normal to correspondingly form the detecting block.

As mentioned hereinabove, it is obtained that each detecting block has one unit length of recorded blocks, and the other unit length of unrecorded blocks. Thus, it is possible to utilize the information corresponding to the unrecorded blocks of the detecting block as a basis for judging whether the selected recording test area is blank according to another embodiment of the present invention. The information corresponding to the recorded blocks of the detecting block and the normal blocks serves as a basis for calculating the optimum power.

For example, when the present invention is applied to the optimum power calibration procedure, the 15 stages of power is applied to the recording test area. The first stage of power is set to be 14 mW, two units of power of 14 mW are applied to the block A501 to form a two unit lengths of normal blocks. The fifth stage of power is set to be 12 mW, one unit of power of 12 mV is applied to the rear section of the block A505, and the other unit may be set as the reading power to be applied on the block 501, so the block 501 constitutes a detecting block. As shown in FIG. 5, it is obtained that one of the unit lengths is the unrecorded block in each detecting block of the optical disc. One of ordinary skill in the art should understand that the recording method, the recording time and the recording power in the optimum power calibration procedure have been typically built in the firmware. In addition, the positions where the detecting power is applied and the level of the detecting power may be changed according to the requirement, or may be randomly selected. The above-mentioned functions may be built in the firmware.

In step S405, it is checked whether the unrecorded blocks 501, 502, 503 are blank. The step S405 is performed with the detecting power especially in the blocks 501, 502 and 503. Thus, if the recording test area selected in the step S403 is totally blank, the unrecorded blocks in each of the detecting blocks 501, 502 and 503 should be blank. Thus, it represents that the optimum power calibration procedure is reliable at this time, and the next step S406 is performed. If any one of the unrecorded blocks 501, 502 and 503 of the detecting block is determined to be not blank, the procedure goes back to the step S402 to select another recording test area again and repeat the above-mentioned steps or enter an error recovery procedure.

In the embodiment of the present invention, whether the detecting blocks are blank can be determined by reading back the information of the unrecorded blocks of the detecting blocks. The information includes a radio frequency (RF) signal, a peak hold value, a bottom hold value, a jitter value, an error rate value and a recorded flag of a blank detection circuit. The reading-back information is compared with a threshold value to determine whether the detecting blocks are blank. Taking the radio frequency signal as an example, if the read RF signals corresponding to the unrecorded blocks of the detecting blocks are greater than the threshold value, it represents that the blank area selected according to the present invention is totally blank. If one of the RF signals is smaller than the threshold value, it represents that the detecting blocks are not totally blank, and it will then search another blank area or the error recovery procedure is entered.

In step S406, the information is read from the normal blocks and the recorded blocks of the detecting block, and the optimum write power is calculated according to the β method (for one-time programmable optical disc) or the γ method (for rewriteable optical disc). The optimum write power is determined by a specific radio frequency signals with better symmetry from RF signals reading back from the above blocks using β method. Similarly, the method for the γ method is similar to that for the β method. Because the γ method and the β method have been introduced in detail in the prior art, detailed descriptions thereof will be omitted.

In step S407, the method ends.

According to the above-mentioned embodiment, it is obtained that the method for detecting the blank area in the present invention may be applied to the optimum power calibration procedure to simplify the blank area testing step before the test recording or even to omit the protection mechanism of repeated identifications. That is, the present invention may simplify the step S402. In the prior art, many complicated means or methods have to be adopted and the identification has to be made again and again to ensure that the test recording area to be recorded is blank in order to ensure the correctness of the optimum power calibration procedure. Thus, the preferred embodiment implemented using the spirit of the present invention can rapidly identify the test recording area to be totally blank and thus save the time for the optimum power calibration procedure.

In addition, although the step S406 of the above-mentioned embodiment is performed after the step S405, one of ordinary skill in the art should understand that the step S406 may be firstly performed to ensure that the optimum power calibration procedure is reliable, and then the step S405 is performed, or the step S405 may be firstly performed and the step S406 is performed to ensure the optimum power according to the design choice. So, the present invention is not limited thereto.

Figure 6:
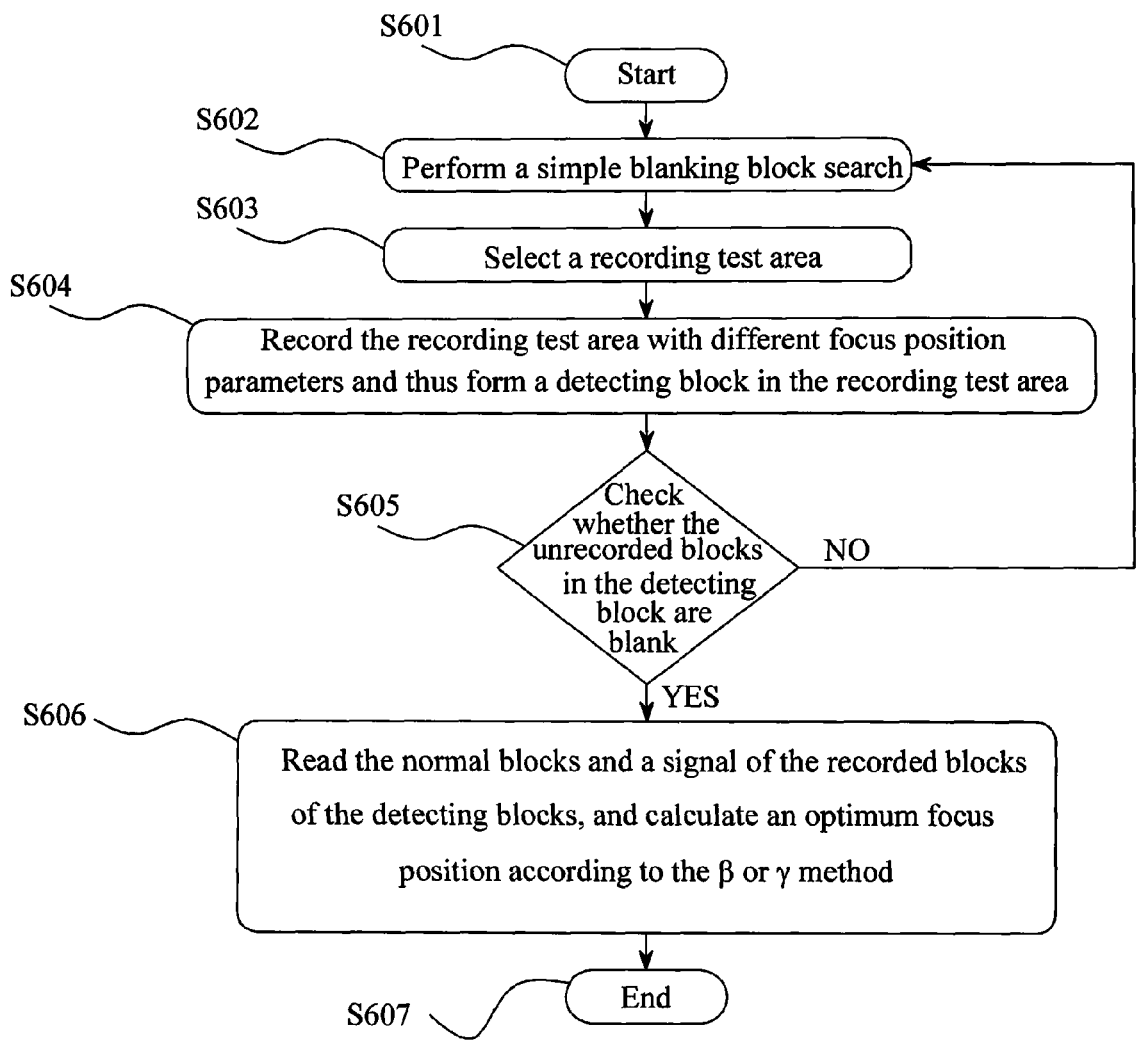
FIG. 6 is a flow chart showing an optimum focus position calibration method of an optical head according to another embodiment of the present invention.

FIG. 6 is a flow chart showing an optimum focus position calibration method of an optical head according to another embodiment of the present invention. As shown in FIG. 6, in addition to the optimum power calibration procedure performed on the optical head, the optimum focus position calibration procedure has to be performed on the optical head before recording so that the recording quality is stable. Thus, it is also possible to apply the method of the present invention to determine that the blank area to be searched is correct and thus ensure that the focus position calibration procedure is reliable. The present invention applied to the optimum focus position calibration procedure includes the following steps.

In step S601, the method starts.

In step S602, a simple blank block search is performed on the optical disc.

In step S603, a recording test area is selected according to the simple blank block search so that the optimum focus position calibration procedure may be performed in the recording test area.

In step S604, the optical head records the recording test area to form a plurality of normal blocks and a plurality of test blocks. In this embodiment, the fixed recording power, which includes two unit lengths of recording power, is applied but the focus position is changed to form the normal blocks. In addition, the detecting blocks are formed according to the method mentioned in the first embodiment. The step of forming the detecting blocks includes the following sub-step (a), (b) or (c).

In the sub-step (a), each of the stages of detecting powers is set to be composed of one unit of reading power and one unit of recording power. When the power is applied to the recording test area, the detecting block is correspondingly formed.

In the sub-step (b), each of the steps of detecting powers may be composed of one unit of recording power, and another unit power is set to be insufficient to form a pit or a mark by reducing an output power of each of analog channels when a total output power is applied to the recording test area so that the detecting block is correspondingly formed.

In the sub-step (c), when one of the units of the detecting power is applied, a focus position or an optical head tilt is deviated such that a pit or a mark cannot be sufficiently formed on the optical disc. When another one of the units of the detecting power is applied, the focus position and the optical head tilt are kept normal to correspondingly form the detecting block.

As mentioned hereinabove, it is obtained that each detecting block has one unit length of recorded blocks, and the other unit length of unrecorded blocks. Thus, it is possible to utilize the information corresponding to the unrecorded blocks of the detecting block as a basis for judging whether the selected recording test area is blank according to another embodiment of the present invention. The information corresponding to the recorded blocks of the detecting block and the normal blocks serves as a basis for calculating the optimum focus position.

In step S605, it is checked whether the unrecorded blocks of the detecting block are blank. Reading the information from the unrecorded blocks of the detecting block can determine whether the detecting block is blank. If any one of the specific focus calibrating blocks is determined to be not blank, the specific test recording block selected in the step S603 may be defective. At this time, it represents that the optimum focus position calibration procedure may be extremely unreliable, and the procedure must go back to the step S602 to select another test recording block again and repeat the above-mentioned steps or enter the error recovery procedure.

In step S606, the information is read from the normal blocks and the recorded blocks of the detecting block, and the optimum focus position is calculated according to the β method (for one-time programmable optical disc) or the γ method (for rewriteable optical disc). The methods for utilizing the β method and the γ method are described above in the first embodiment.

In step S607, the method ends.

Although the step S605 is performed before the step S606, one of ordinary skill in the art should understand that the step S606 may be firstly performed and then the step S605 is performed to ensure that the optimum focus position calibration procedure is reliable, or the step S605 may be firstly performed and then the step S606 is performed according to the design choice.

In summary, the spirit of the present invention is to form a plurality of detecting blocks in the selected recording test area and to check whether the detecting block is blank to ensure whether the selected recording test area is totally blank and thus to provide the precise optimum power calibration procedure or optimum focus position calibration procedure when the power calibration and focus position calibration procedures are performed. According to the embodiments of the present invention, the blank area detection of the optimum power calibration procedure and the optimum focus position calibration procedure before test recording may be simplified, or no complicated protection mechanism is needed. Thus, the time for each of the optimum power calibration procedure and the optimum focus position calibration procedure may be saved.

In addition, in either the optimum power calibration procedure or the optimum focus position calibration procedure according to the embodiments of the present invention, the positions of the formed detecting blocks and the number of the detecting blocks may be determined according to the requirement, and the positions of the formed detecting blocks can be randomly selected. For example, the level of the detecting power can be timely increased according to the retry times. If the disc is loaded at this time or the same time but this mechanism has been used before the optimum power calibration procedure or in the optimum power calibration procedure at different times, the level of the detecting power can be timely decreased after the test recording area is identified to be blank. The associated parameters mentioned hereinabove may be built in the firmware of the optical drive.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for detecting a blank area of a power calibration area, the method comprising the steps of:
    selecting a recording test area in the power calibration area of an optical disc;
    writing the recording test area and thus forming a plurality of normal blocks and a plurality of detecting blocks, wherein each of the detecting blocks comprises one unit of an unrecorded block and one unit of a recorded block;
    determining whether the unrecorded blocks of the detecting blocks are blank;

repeating the above-mentioned steps or entering an error recovery procedure if the unrecorded blocks of the detecting blocks are not totally blank; and determining the recording test area to be blank if the unrecorded blocks of the detecting blocks are totally blank.

2. The method according to claim 1, wherein the step of writing the recording test area comprises:

writing the recording test area with a power composed of multiple stages of normal power and multiple stages of detecting power, wherein each stage of the normal power is composed of two units of recording power, and the normal block is formed when writing the recording test area with the normal power.

3. The method according to claim 2, wherein the step of forming the detecting blocks comprises:

setting each stage of detecting power to be composed of one unit of reading power and one unit of recording power; and performing writing using the detecting power to form the detecting block having one unit of a recorded block and one unit of an unrecorded block.

4. The method according to claim 2, wherein the step of forming the detecting blocks comprises:

setting one unit of each stage of detecting power to be the recording power, and the other unit to be insufficient to form a pit or a mark by reducing an output power of each of analog channels when a total output power is applied to the recording test area so that the detecting block having one unit of a recorded block and one unit of an unrecorded block is formed.

5. The method according to claim 2, wherein the step of forming the detecting blocks comprises:

deviating a focus position or an optical head tilt such that a pit or a mark cannot be sufficiently formed on the optical disc when one of the units of the detecting powers is applied while keeping the focus position and the optical head tilt normal when the other unit of the detecting power is applied in order to form the detecting block having one unit of recorded block and one unit of unrecorded block.

6. The method according to claim 1, wherein the step of determining whether the unrecorded blocks of the detecting blocks are blank comprises:

reading information from the detecting blocks and comparing the information with a threshold value; and determining the unrecorded blocks of the detecting blocks to be not blank when at least one piece of the information is smaller than the threshold value, and determining the unrecorded blocks of the detecting blocks to be blank when the information is greater than the threshold value.

7. The method according to claim 6, wherein the information comprises:

a radio frequency signal, a peak hold value, a bottom hold value, a jitter value, an error rate value, a recorded flag of a blank detection circuit or the combination of the above.

8. The method according to claim 1, further comprising the step of:

using signals read from the normal blocks and the recorded blocks of the detecting blocks as a basis for calculating an optimum power.

9. The method according to claim 8, wherein the signals comprise a radio frequency signal.

10. A method for detecting a blank area of a power calibration area, the method comprising:

selecting a recording test area in the power calibration area of an optical disc;

applying multiple stages of normal power and multiple stages of detecting power to the recording test area and thus forming a plurality of normal blocks and a plurality of detecting blocks, wherein each detecting block comprises one unit of an unrecorded block and one unit of a recorded block, and the plurality of normal blocks are formed by applying the multiple stages of normal power having the same recording power and by changing a focus position each time;

determining whether the unrecorded blocks of the detecting blocks are blank;

repeating the above steps or entering an error recovery procedure if the unrecorded blocks of the detecting blocks are not totally blank; and determining the selected recording test area to be blank if the unrecorded blocks of the detecting blocks are totally blank.

11. The method according to claim 10, wherein the step of forming the detecting blocks comprises:

setting each stage of detecting powers to be composed of one unit of reading power and one unit of recording power; and performing recording using the detecting power to form the detecting blocks having the recorded block and the unrecorded block.

12. The method according to claim 10, wherein the step of forming the detecting blocks comprises:

setting one unit of each stage of detecting power to be the recording power, and the other unit power to be insufficient to form a pit or a mark by reducing an output power of each of analog channels when a total output power is applied to the recording test area so that the detecting blocks having the recorded block and the unrecorded block are formed.

13. The method according to claim 11, wherein the step of forming the detecting blocks comprises:

deviating a focus position or an optical head tilt such that a pit or a mark cannot be sufficiently formed on the optical disc when one of the units of the detecting power is applied while keeping the focus position and the optical head tilt normal when the other unit of the detecting power is applied in order to form the detecting block having the recorded block and the unrecorded block.

14. The method according to claim 10, wherein the step of determining whether the unrecorded blocks of the detecting blocks are blank comprises:

reading back information from the detecting blocks and comparing the information with a threshold value; and determining the unrecorded blocks of the detecting blocks to be not blank when at least one piece of the information is smaller than the threshold value, and judging the unrecorded blocks of the detecting blocks to be blank when the information is greater than the threshold value.

15. The method according to claim 14, wherein the information comprises:

a radio frequency signal, a peak hold value, a bottom hold value, a jitter value, an error rate value, a recorded flag of a blank detection circuit or the combination thereof.

16. The method according to claim 10, further comprising the step of:

using signals read from the normal blocks and the recorded blocks of the detecting blocks as a basis for calculating an optimum focus position.

17. The method according to claim 16, wherein the signals comprise a radio frequency signal.

* * * * *